United States Patent
Huang et al.

(10) Patent No.: US 12,499,705 B2
(45) Date of Patent: Dec. 16, 2025

(54) OPTICAL IDENTIFICATION DEVICE AND RELATED CASE

(71) Applicant: PixArt Imaging Inc., Hsin-Chu (TW)

(72) Inventors: Yong-Nong Huang, Hsin-Chu (TW); Hui-Hsuan Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 400 days.

(21) Appl. No.: 17/891,147

(22) Filed: Aug. 19, 2022

(65) Prior Publication Data
US 2024/0062576 A1    Feb. 22, 2024

(51) Int. Cl.
*G06V 40/13*    (2022.01)

(52) U.S. Cl.
CPC ...... *G06V 40/1324* (2022.01); *G06V 40/1329* (2022.01)

(58) Field of Classification Search
CPC ........... G06V 40/1324; G06V 40/1329; G06V 40/1318; G06V 40/1341; G06V 40/15
See application file for complete search history.

(56) References Cited

U.S. PATENT DOCUMENTS

| | | | |
|---|---|---|---|
| 10,014,341 B1 * | 7/2018 | Hsu | H10F 39/8067 |
| 2003/0103686 A1 * | 6/2003 | Ogura | G06V 40/145 382/321 |
| 2017/0372152 A1 * | 12/2017 | Baek | G06V 40/1394 |
| 2020/0394382 A1 * | 12/2020 | Kim | G06V 40/1318 |
| 2021/0063816 A1 * | 3/2021 | He | G02F 1/133615 |
| 2021/0406496 A1 * | 12/2021 | Tao | H01L 23/60 |

FOREIGN PATENT DOCUMENTS

| | | | | |
|---|---|---|---|---|
| CN | 210605731 U | * | 5/2020 | ......... G06K 9/00046 |
| CN | 111837127 A | * | 10/2020 | ......... G06V 40/1324 |
| CN | 213659463 U | * | 7/2021 | ......... G06V 40/1318 |
| TW | 201624352 A | * | 7/2016 | ......... G02B 13/0015 |
| WO | WO-2021042593 A1 | * | 3/2021 | ........... G02B 6/0068 |

OTHER PUBLICATIONS

Paschotta, Rüdiger. Encyclopedia of Laser Physics and Technology, RP Photonics, Oct. 2017, (Year: 2017).*
Edmund Optics, Laser Optics Resource Guide, Section 11.3—Anti-Reflection (AR) Coatings, 2020 (Year: 2020).*
Kono et al., International Journal of Thermophysics —vol. 40, article No. 51, (2019) (Year: 2019).*
Paschotta, Rüdiger, Encyclopedia of Laser Physics and Technology, RP Photonics, Plastic Optics, 2020 (Year: 2020).*

* cited by examiner

*Primary Examiner* — Michelle M Iacoletti
(74) *Attorney, Agent, or Firm* — Winston Hsu

(57) ABSTRACT

An optical identification device includes a top cover, a circuit board, an optical detection module, an optical deviation component and an anti-reflection component. The circuit board is disposed under the top cover. The optical detection module is disposed on the circuit board, and the optical detection module includes a light emitter and a light receiver. The optical deviation component is disposed on the light emitter of the optical detection module and adapted to change a transmission direction of an optical signal emitted by the light emitter, so that the optical signal is projected onto the top cover in an inclined manner. The anti-reflection component is disposed on a surface of the top cover facing the optical detection module and adapted to increase a penetration rate of the optical signal projected onto the top cover.

11 Claims, 2 Drawing Sheets

OPTICAL IDENTIFICATION DEVICE AND RELATED CASE

BACKGROUND OF THE INVENTION

1. Field of the Invention

The present invention relates to an optical identification device, and more particularly, to an optical identification device of providing fingerprint identification, heart rate measurement and finger navigation and a related case of the optical identification device.

2. Description of the Prior Art

A conventional optical fingerprint identification device utilizes a visible beam to be an illumination light source, and a top cover of the optical fingerprint identification device where the finger touches is made as a light color detection region, so that the visible beam passes through the top cover to acquire a pattern of the fingerprint. The fingerprint identification device in other types may utilize capacitance identification technology or ultrasound identification technology to identify the fingerprint. The optical identification technology, the capacitance identification technology and the ultrasound identification technology are only applied to identify the fingerprint, and cannot execute heart rate measurement and finger navigation. Therefore, design of an optical identification device capable of simultaneously executing fingerprint identification, heart rate measurement and finger navigation is an important issue in the optical detection industry.

SUMMARY OF THE INVENTION

The present invention provides an optical identification device of providing fingerprint identification, heart rate measurement and finger navigation and a related case of the optical identification device for solving above drawbacks.

According to the claimed invention, an optical identification device includes a top cover, a circuit board, an optical detection module, an optical deviation component and an anti-reflection component. The circuit board is disposed under the top cover. The optical detection module is disposed on the circuit board, and the optical detection module includes a light emitter and a light receiver. The optical deviation component is disposed on the light emitter of the optical detection module and adapted to change a transmission direction of an optical signal emitted by the light emitter, so that the optical signal is projected onto the top cover in an inclined manner. The anti-reflection component is disposed on a surface of the top cover facing the optical detection module and adapted to increase a penetration rate of the optical signal projected onto the top cover.

According to the claimed invention, the optical deviation component is a prism, and an apex angle of the prism is smaller than seventy degrees.

According to the claimed invention, a predefined angle of the optical signal projected onto the top cover is greater than forty-five degrees, and the predefined angle is an included angle between the transmission direction of the optical signal and a planar normal vector of the optical detection module.

According to the claimed invention, the optical identification device further includes a plurality of optical deviation components disposed on the light emitter of the optical detection module, and adapted to change the transmission direction of the optical signal in several orientations.

According to the claimed invention, the top cover includes a detection region, the optical signal emitted by the optical detection module is projected onto a target object contacting the detection region, and a refractive index of the anti-reflection component is smaller than a refractive index of the top cover. The optical identification device further includes a protection component disposed on the other surface of the top cover opposite to the optical detection module, difference between a refractive index of the protection component and the refractive index of the target object is smaller than a predefined range.

According to the claimed invention, the optical identification device further includes a protection component disposed on the other surface of the top cover opposite to the optical detection module, a refractive index of the protection component is ranged between 1.2~1.8. Difference between a refractive index of the top cover and the refractive index of the target object is smaller than a predefined range. Difference between the refractive index of the protection component and the refractive index of the target object is smaller than difference between the refractive index of the top cover and the refractive index of the protection component, and the difference between the refractive index of the top cover and the refractive index of the protection component is smaller than difference between the refractive index of the top cover and the reflective index of the anti-reflection component.

According to the claimed invention, a refractive index of the top cover is ranged between 1.2~1.8.

According to the claimed invention, the optical identification device further includes a first optical diffusion component disposed between the optical deviation component and the optical detection module. The optical identification device further includes a second optical diffusion component disposed on the other surface of the top cover opposite to the optical detection module.

According to the claimed invention, the light receiver receives the optical signal reflected from the top cover. The optical deviation component is not disposed above the light receiver.

According to the claimed invention, a case of covering an optical detection module includes a top cover and an anti-reflection component. The top cover has a refractive index ranged between 1.2~1.8. The optical detection module is disposed under the top cover. The anti-reflection component is disposed on a surface of the top cover facing the optical detection module and adapted to increase a penetration rate of an optical signal emitted by the optical detection module and projected onto the top cover.

The optical identification device of the present invention can use the invisible light as the light emitter, and dispose the optical deviation component above the light emitter to enlarge the beam angle, and further dispose the anti-reflection component on the bottom surface of the top cover to increase the penetration rate of the optical signal. Besides, the optical identification device can design an effective range of the refractive index of the protection component disposed on the top surface of the top cover, so as to ensure that the fingerprint can have the clear details and preferred contrast; the optical identification device can further dispose the optical diffusion components under the optical deviation component and on the top surface of the top cover, for illuminating the finger and eliminating the dark region on the center of the fingerprint.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
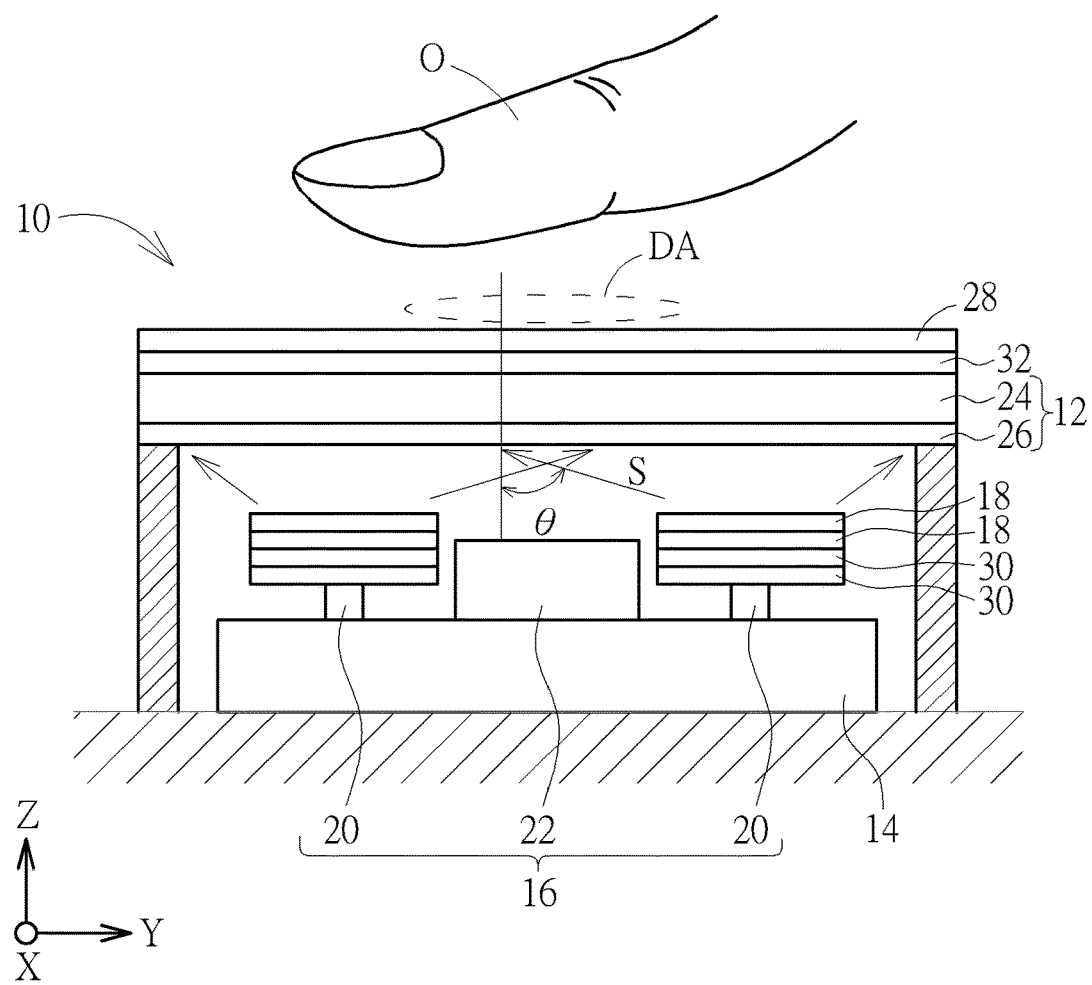
FIG. 1 is a sectional view of an optical identification device according to an embodiment of the present invention.

Please refer to FIG. 1. FIG. 1 is a sectional view of an optical identification device 10 according to an embodiment of the present invention. The optical identification device 10 can include a case 12, a circuit board 14, an optical detection module 16 and an optical deviation component 18. The circuit board 14 can be disposed inside the case 12. The optical detection module 16 can be disposed on the circuit board 14, and have a light emitter 20 and a light receiver 22. The optical deviation component 18 can be disposed above the light emitter 20 of the optical detection module 16, and not above the light receiver 22. The case 12 can include a top cover 24 and an anti-reflection component 26. The circuit board 14 and the optical detection module 16 can be disposed under the top cover 24. The anti-reflection component 26 can be disposed on a surface of the top cover 24 facing the optical detection module 16.

The optical deviation component 18 can change a transmission direction of an optical signal S emitted by the light emitter 20, and the optical signal S can be projected onto the top cover 24 in an inclined manner. A beam angle of the optical signal S emitted by the light emitter 20 can be adjusted to one hundred degrees or more when passing through the optical deviation component 18. In the embodiment, the optical identification device 10 can set a detection region DA of the top cover 24 located on a center of the case 12, and therefore the detection region DA can be directly above the light receiver 22. The optical detection module 16 can include a plurality of light emitters 20 respectively disposed on different sides of the light receiver 22. The beam angle of the optical signal S emitted by each light emitter 20 can be enlarged by the optical deviation component 18 to stretch out and locate above the light receiver 22, and further can be partly overlapped with the beam angle of the optical signal S emitted by other light emitter 20.

Generally, the optical deviation component 18 can be a prism, or any optical element capable of varying the transmission direction of the light beam. An apex angle of the prism can be preferably equal to or smaller than seventy degrees, so that a deviation angle of the optical signal S through the optical deviation component 18 can be at least greater than forty-five degrees. In one possible embodiment of the present invention, the apex angle of the optical deviation component 18 may be set as seventy degrees, and the beam angle of the optical signal S emitted by the light emitter 20 can achieve or exceed one hundred degrees, so that a predefined angle of the optical signal S projected onto the top cover 24 can be greater than forty-five degrees for preferred detection accuracy of the optical identification device 10. The predefined angle θ can be defined as an included angle between a planar normal vector of the optical detection module 16 and the transmission direction (such as an arrow direction shown in FIG. 1) of the optical signal S.

The present invention can dispose several optical deviation components 18 on the light emitter 20 of the optical detection module 16, and the optical deviation components 18 are used to change the transmission direction of the optical signal S in several orientations. For example, the optical identification device 10 may dispose two optical deviation components 18 on each light emitter 20, and the two optical deviation components 18 can respectively change the transmission directions of the optical signal S along X-axis and Y-axis; application of the optical deviation component 18 is not limited to the above-mentioned embodiment, which depends on an actual demand.

The optical identification device 10 of the present invention can provide at least one function of heart rate measurement, fingerprint identification and finger navigation. A target object O (which means a user's finger) can touch the detection region DA of the top cover 24. The optical signal S emitted by the light emitter 20 can pierce through the optical deviation component 18 and project onto the target object O in the inclined manner. Some part of the optical signal S may pierce through the skin of the target object O to project onto the blood vessel inside the skin for reflection. The light receiver 22 can receive and analyze the reflected optical signal S for the heart rate measurement; therefore, the optical signal S can be invisible light with a wavelength ranged between 700 nm and 1800 nm. Other part of the optical signal S can be projected onto and then reflected by the skin of the target object O. The light receiver 22 can analyze intensity variation of the reflected optical signal S to acquire the fingerprint on the user's finger, and further can execute the finger navigation in accordance with a movement of the skin's feature on the target object O.

The anti-reflection component 26 can be disposed on a bottom surface of the top cover 24 and used to increase a penetration rate of the optical signal S projected onto the top cover 24. For improving the identification accuracy of the optical identification device 10, the optical identification device 10 can optionally include a protection component 28, a first optical diffusion component 30 and a second optical diffusion component 32. The component 28 can be disposed on the other surface of the top cover 24 opposite to the optical detection module 16, which means a top surface of the top cover 24 opposite to the anti-reflection component 26. The protection component 28 can be made by solid material to avoid the optical identification device 10 from abrasion. The first optical diffusion component 30 can be disposed between the optical deviation component 18 and the optical detection module 16, and used to uniformly diffuse the optical signal S. The second optical diffusion component 32 can be disposed on the other surface of the top cover 24 opposite to the optical detection module 16, or disposed between the protection component 28 and the top cover 24, for further diffusing the optical signal S.

Figure 2:
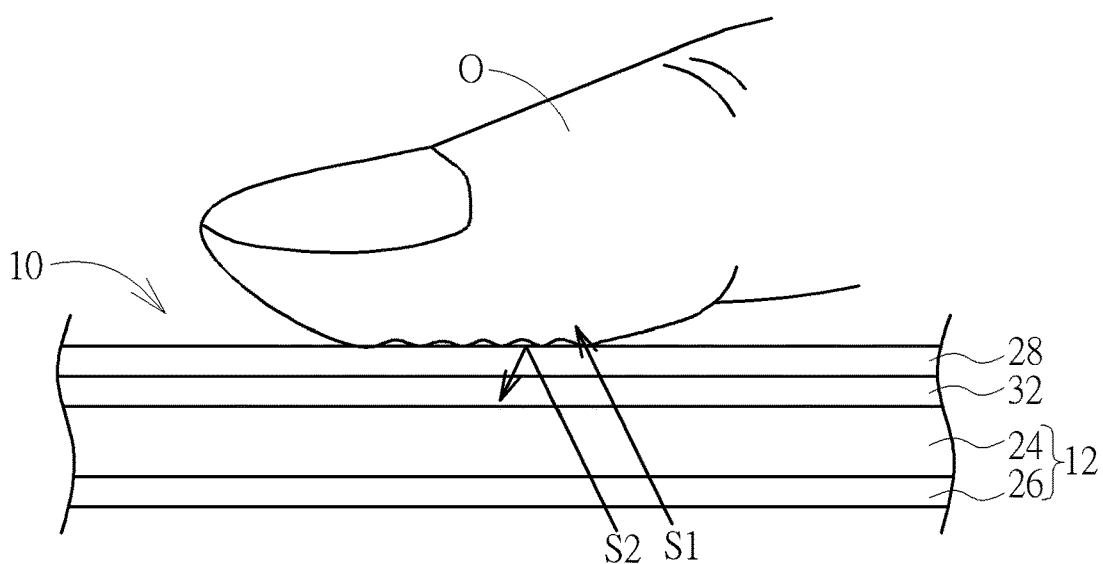
FIG. 2 is an enlarged diagram of parts of the optical identification device and the target object according to the embodiment of the present invention.

Please refer to FIG. 2. FIG. 2 is an enlarged diagram of parts of the optical identification device 10 and the target object O according to the embodiment of the present invention. A bottom surface of the target object O which touches the optical identification device 10 can have the fingerprint with an uneven curve. In the embodiment, the air can have a refractive index of 1, the skin (which means the target object O) can have the refractive index about 1.55, and the top cover 24 made by normal material can have the refractive index about 1.585. The present invention designs that the anti-reflection component 26 can have the refractive index lower than the refractive index of the top cover 24; for example, the anti-reflection component 26 can have the refractive index about 1.225, and preferably ranged between 1.2~1.8. The anti-reflection component 26 can prevent the optical signal S from being directly reflected from the top cover 24 toward the light receiver 22, so as to allow the optical signal S smoothly piercing through the case 12 and projecting onto the target object O via property of the refractive indices of the top cover 24 and the air.

The protection component 28 can be located between the target object O and the top cover 24, and difference between the refractive index of the protection component 28 and the refractive index of the target object O can be preferably smaller than a predefined range; for example, the protection component 28 can have the refractive index about 1.4 or ranged between 1.2~1.8, so the foresaid predefined range can be computed accordingly. If the refractive index of the protection component 28 is close to the refractive index of the target object O, the optical signal S can be projected onto the target object O without unexpected energy loss to acquire the fingerprint having clear details. As shown in FIG. 2, when the optical signal S1 is projected onto a bulge on the fingerprint of the target object O, the optical signal S1 can directly pierce through the skin of the target object O because the refractive indices of the top cover 24, the protection component 28 and the skin are similar; similarity between the refractive indices of the top cover 24, the protection component 28 and the skin can be defined as the difference between the refractive index of the protection component 28 and the refractive index of the target object O is smaller than the predefined range, and then the difference between the refractive index of the protection component 28 and the refractive index of the target object O can be preferably smaller than difference between the refractive index of the top cover 24 and the refractive index of the protection component 28, and further the difference between the refractive index of the top cover 24 and the refractive index of the protection component 28 can be preferably smaller than difference between the refractive index of the top cover 24 and the refractive index of the anti-reflection component 26, or can be defined as the refractive index of the protection component 28 can be greater than the refractive index of the top cover 24, and then the refractive index of the top cover 24 can be greater than the refractive index of the anti-reflection component 26. When the optical signal S2 is projected onto a dent on the fingerprint of the target object O, the optical signal S2 cannot pierce through the target object O because of total internal reflection, which results from the refractive index of the protection component 28 being greater than the refractive index of the air. The light receiver 22 can receive the optical signal S1 with low intensity and the optical signal S2 with high intensity to acquire the fingerprint having the clear details.

In addition, the optical identification device 10 of the present invention cannot only accurately design the refractive indices of the anti-reflection component 26 and the protection component 28, but also the refractive index of the top cover 24. Difference between the refractive index of the top cover 24 and the refractive index of the target object O can be preferably smaller than another predefined range. The top cover 24 made by normal material can have the refractive index about 1.585, however, the present invention may optionally enlarge the refractive index of the top cover 24 ranged between 1.2~1.8. The foresaid predefined range can be computed in accordance with the actual difference between the refractive index of the top cover 24 and the refractive index of the target object O.

Figure 3:
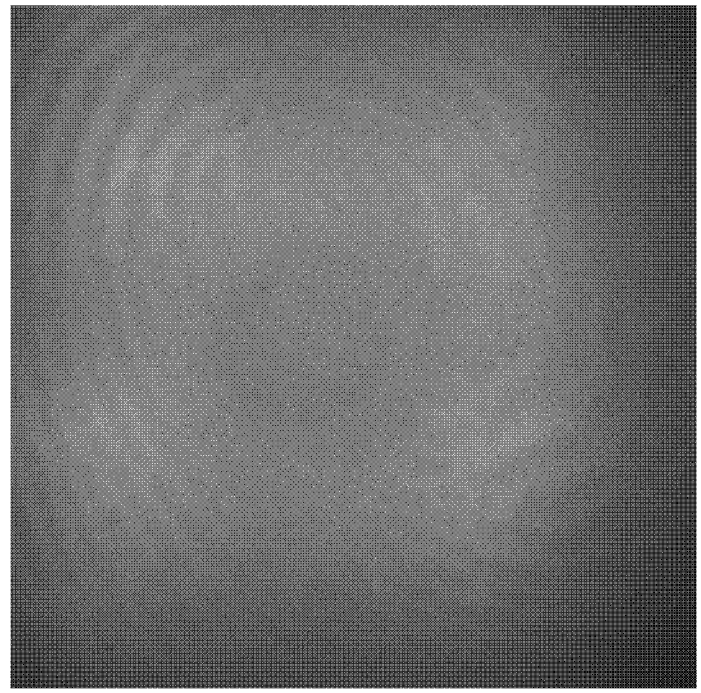
FIG. 3 and FIG. 4 are diagrams of experimental data made by the optical identification device with different optical elements according to the embodiment of the present invention.
Figure 4:
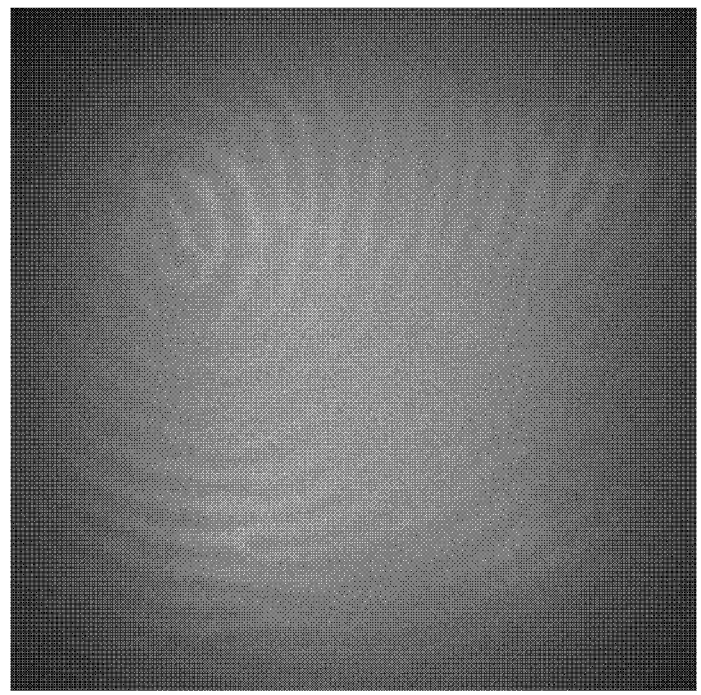

Please refer to FIG. 3 and FIG. 4. FIG. 3 and FIG. 4 are diagrams of experimental data made by the optical identification device 10 with different optical elements according to the embodiment of the present invention. When the optical identification device 10 disposes the optical deviation component 18 above the light emitter 20 and further disposes the anti-reflection component 26 on the top cover 24, the optical signal S can be projected onto the detection region DA of the top cover 24 in the large-angle inclined manner for acquiring the clear fingerprint, as shown in FIG. 3; however, a center of the fingerprint may have a dark region. The optical identification device 10 can further dispose the protection component 28, the first optical diffusion component 30 and the second optical diffusion component 32 on proper positions for guiding the optical signal S to illuminate the dark region on the center of the fingerprint and acquiring a preferred detection result, as shown in FIG. 4.

In conclusion, the optical identification device of the present invention can utilize the invisible light as the light emitter, and dispose the optical deviation component above the light emitter to enlarge the beam angle, and further dispose the anti-reflection component on the bottom surface of the top cover to increase the penetration rate of the optical signal. Besides, the optical identification device can design an effective range of the refractive index of the protection component disposed on the top surface of the top cover, so as to ensure that the fingerprint can have the clear details and preferred contrast; the optical identification device can further dispose the optical diffusion components under the optical deviation component and on the top surface of the top cover, for illuminating the finger and eliminating the dark region on the center of the fingerprint.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An optical identification device comprising:
a top cover,
a circuit board disposed under the top cover;
an optical detection module disposed on the circuit board, wherein the optical detection module comprises a light emitter and a light receiver, wherein the light emitter is coupled to an optical diffusion component and an optical prism;
the optical diffusion component disposed between the optical prism and the light emitter of the optical detection module and adapted to change a transmission direction of an optical signal emitted by the light emitter, so that the optical signal is projected onto the top cover in an inclined manner, wherein the light receiver is being without the optical diffusion component and the optical prism; and
an anti-reflection component disposed on a surface of the top cover facing the optical detection module and adapted to increase a penetration rate of the optical signal projected onto the top cover.

2. The optical identification device of claim 1, wherein an apex angle of the optical prism is smaller than seventy degrees.

3. The optical identification device of claim 1, wherein a predefined angle of the optical signal projected onto the top cover is greater than forty-five degrees, and the predefined angle is an included angle between the transmission direction of the optical signal and a planar normal vector of the optical detection module.

4. The optical identification device of claim 1, wherein the optical identification device further comprises a plurality of optical prisms disposed on the light emitter of the optical detection module, and adapted to change the transmission direction of the optical signal in several orientations.

5. The optical identification device of claim 1, wherein the top cover comprises a detection region, the optical signal emitted by the optical detection module is projected onto a target object contacting the detection region, and a refractive index of the anti-reflection component is smaller than a refractive index of the top cover.

6. The optical identification device of claim 5, wherein the optical identification device further comprises a protection component disposed on the other surface of the top cover opposite to the optical detection module, a difference between a refractive index of the protection component and the refractive index of the target object is smaller than a predefined range.

7. The optical identification device of claim 5, wherein the optical identification device further comprises a protection component disposed on the other surface of the top cover opposite to the optical detection module, a refractive index of the protection component is ranged between 1.2~1.8.

8. The optical identification device of claim 7, wherein a difference between a refractive index of the top cover and the refractive index of the target object is smaller than a predefined range, a difference between the refractive index of the protection component and the refractive index of the target object is smaller than a difference between the refractive index of the top cover and the refractive index of the protection component, and the difference between the refractive index of the top cover and the refractive index of the protection component is smaller than a difference between the refractive index of the top cover and the refractive index of the anti-reflection component.

9. The optical identification device of claim 1, wherein a refractive index of the top cover is ranged between 1.2~1.8.

10. The optical identification device of claim 1, wherein the optical identification device further comprises another optical diffusion component disposed on the other surface of the top cover opposite to the optical detection module.

11. The optical identification device of claim 1, wherein the light receiver receives the optical signal reflected from the top cover.

* * * * *